US011947355B2

(12) United States Patent
Lamprecht (10) Patent No.: US 11,947,355 B2
(45) Date of Patent: Apr. 2, 2024

(54) METHOD AND APPARATUS FOR ZONE MAPPING (71) Applicant: Topcon Positioning Systems, Inc., Livermore, CA (US)

(72) Inventor: Marko Lamprecht, Gera (DE)

(73) Assignee: Topcon Positioning Systems, Inc., Livermore, CA (US)

(*) Notice: Subject to any disclaimer, the term of this patent is extended or adjusted under 35 U.S.C. 154(b) by 341 days.

(21) Appl. No.: 17/071,959

(22) Filed: Oct. 15, 2020

(65) Prior Publication Data
US 2022/0121206 A1    Apr. 21, 2022

(51) Int. Cl.
*G01C 21/00*   (2006.01)
*A01C 21/00*   (2006.01)
*A01M 7/00*    (2006.01)
*B60K 35/00*   (2006.01)
*G05D 1/00*    (2006.01)
G06F 3/0484   (2022.01)
G06V 20/13    (2022.01)

(52) U.S. Cl.
CPC ......... *G05D 1/0212* (2013.01); *A01C 21/005* (2013.01); *A01M 7/0089* (2013.01); *B60K 35/00* (2013.01); *G01C 21/3826* (2020.08); *B60K 2370/166* (2019.05); *G05D 1/0088* (2013.01); *G05D 2201/0201* (2013.01); *G06F 3/0484* (2013.01); *G06V 20/13* (2022.01)

(58) Field of Classification Search
None
See application file for complete search history.

(56) References Cited

U.S. PATENT DOCUMENTS

| 5,467,271 | A | | 11/1995 | Abel et al. |
| 5,721,679 | A | | 2/1998 | Monson |
| 5,870,689 | A | * | 2/1999 | Hale ............... A01B 79/005 |
| | | | | 702/5 |
| 5,878,371 | A | | 3/1999 | Hale et al. |
| 6,199,000 | B1 | | 3/2001 | Keller et al. |
| 6,236,907 | B1 | | 5/2001 | Hauwller et al. |

(Continued)

OTHER PUBLICATIONS

Van Evert et al., "Big Data for Weed Control and Crop Protection," Mar. 22, 2017, Weed Research, vol. 57, Issue 4, pp. 218-233.

(Continued)

*Primary Examiner* — James M McPherson
(74) *Attorney, Agent, or Firm* — Chiesa Shahinian & Giantomasi PC (57) ABSTRACT

A method and system for zone mapping displays a geographic area to a user and receives input from the user identifying a zone of the geographic area. An identification of an agricultural material to be applied in the zone is also received and an application plan is generated in response. The application plan is generated based on features identified in the zone, the agricultural material to be applied, and application requirements and restrictions associated with the agricultural material that are identified by the manufacturer of the material and, in some cases, governmental agencies. The agricultural machine tracks the application of the agricultural material and transmits application information for storage in the zone mapping system for later retrieval in response to requests, such as compliance requests.

14 Claims, 6 Drawing Sheets

(56) References Cited

U.S. PATENT DOCUMENTS

| | | |
|---|---|---|
| 6,606,542 B2 | 8/2003 | Hauwller et al. |
| 6,877,675 B2 | 4/2005 | Benneweis |
| 6,889,620 B2 | 5/2005 | Fraisse et al. |
| 8,412,419 B1 | 4/2013 | Seamon et al. |
| 8,521,372 B2 | 8/2013 | Hunt et al. |
| 8,855,937 B2 | 10/2014 | Lindores |
| 9,004,378 B2 | 4/2015 | Orcutt et al. |
| 9,563,848 B1 | 2/2017 | Hunt |
| 9,622,402 B2 | 4/2017 | Kinzenbaw et al. |
| 9,667,710 B2 | 5/2017 | Wilbur et al. |
| 2002/0035431 A1 | 3/2002 | Ell |
| 2011/0112730 A1* | 5/2011 | Rekow ................. G05D 1/0219 701/50 |
| 2014/0136286 A1 | 5/2014 | Hovis et al. |
| 2015/0242970 A1 | 8/2015 | Avey et al. |
| 2016/0180473 A1 | 6/2016 | Groeneveld |
| 2017/0105335 A1 | 4/2017 | Xu et al. |
| 2018/0192577 A1* | 7/2018 | Smith ...................... A01C 7/20 |
| 2018/0359905 A1* | 12/2018 | Foster ................. A01B 69/008 |
| 2019/0239416 A1* | 8/2019 | Green ................. A01B 79/005 |
| 2021/0003416 A1* | 1/2021 | Wilson ................. G05D 1/0219 |

OTHER PUBLICATIONS

Fountas et al., "A Model of Decision-Making and Information Flows for Information-Intensive Agriculture," 2005, Agricultural Systems, vol. 87, Issue 2, pp. 192-210.

International Search Report and Written Opinion dated Dec. 6, 2021, in connection with International Patent Application No. PCT/US2021/071184, filed Aug. 13, 2021, 12 pgs.

* cited by examiner

| Feature | Pesticide A | Growth Promoter A | Fertilizer A | Equipment Manufacturer |
|---|---|---|---|---|
| Standing Water | 5 ft | 5.6 ft | 2 ft | 1 ft |
| Flowing Water | 7 ft | 8 ft | 4 ft | 1 ft |
| Slope | N/A | N/A | N/A | 7% |
| Adjacent Crop | 10 ft | 10 ft | 0 ft | N/A |
| Human/Animal Traffic | 10 ft | 5 ft | 2 ft | N/A |
| ... | | | | |
| ... | | | | |

FIG. 5

| Zone/Feature | Coordinate A | Coordinate B | Coordinate C | Coordinate D | Coordinate E |
|---|---|---|---|---|---|
| Zone A | 40.907357; -74.419585 | 40.907300; -74.418394 | 40.906907; -74.418378 | 40.907012; -74.419757 | 40.907357; -74.419585 |
| Feature A | 40.907259; -74.419494 | 40.907041; -74.419333 | 40.907061; -74.419633 | 40.907259; -74.419494 | |
| Feature B | 40.907600; -74.419344 | 40.907632; -74.418678 | 40.907337; -74.416629 | 40.907199; -74.416688 | 40.907600; -74.419344 |
| Feature C | 40.912510; -74.412188 | 40.912850; -74.410943 | 40.912088; -74.410702 | 40.912035; -74.411979 | 40.912510; -74.412188 |
| Feature D | 40.921483; -74.406271 | 40.919148; -74.405198 | 40.919277; -74.408910 | 40.921483; -74.406271 | |
| ... | | | | | |
| ... | | | | | |

METHOD AND APPARATUS FOR ZONE MAPPING

FIELD OF THE INVENTION

The present disclosure relates generally to agricultural field maps and more particularly to mapping zones of an agricultural field map.

BACKGROUND

Agricultural operations benefit from the use of controls and automation. Automation requires preplanning to ensure that operations are performed as required. For example, an automated agricultural machine requires information pertaining to where agricultural material should be applied and the rate at which the agricultural material should be applied.

In addition, regulations require documentation of the application of agricultural materials. The legal requirements in terms of application are becoming more stringent. More and more often farmers need to change the application rate depending on different types of adjacent structures like hedges or waterways. Typical application systems can adjust only the application rate. What is needed is an easy and efficient method to identify where agricultural materials should be applied, identify application specifics pertaining to how the agricultural material should be applied to an identified area, and document the application of the agricultural material to the identified area.

SUMMARY

In one embodiment, a method for zone mapping and tracking the application of agricultural material to zones of a geographic area includes displaying a geographic area of interest to a user via a display of a zone mapping system. The user identifies a zone of the geographic area that is to be treated using agricultural materials. The user identifies the agricultural material to be applied to the zone and an application plan for the zone is determined. Determining the application plan for the selected zone includes identifying a feature in the zone and identifying an offset from the feature based on a type of the feature and the agricultural material to be applied. Geographic coordinates bounding an area adjacent to the feature are determined based on the offset identified. The application plan is then transmitted to an agricultural machine which operates substantially in accordance with the application plan. The agricultural machine tracks the application of the agricultural material and transmits this information to the zone mapping system. The application information is then stored in a database associated with the zone mapping system for later retrieval in response to requests for the application information.

DETAILED DESCRIPTION

Figure 1:
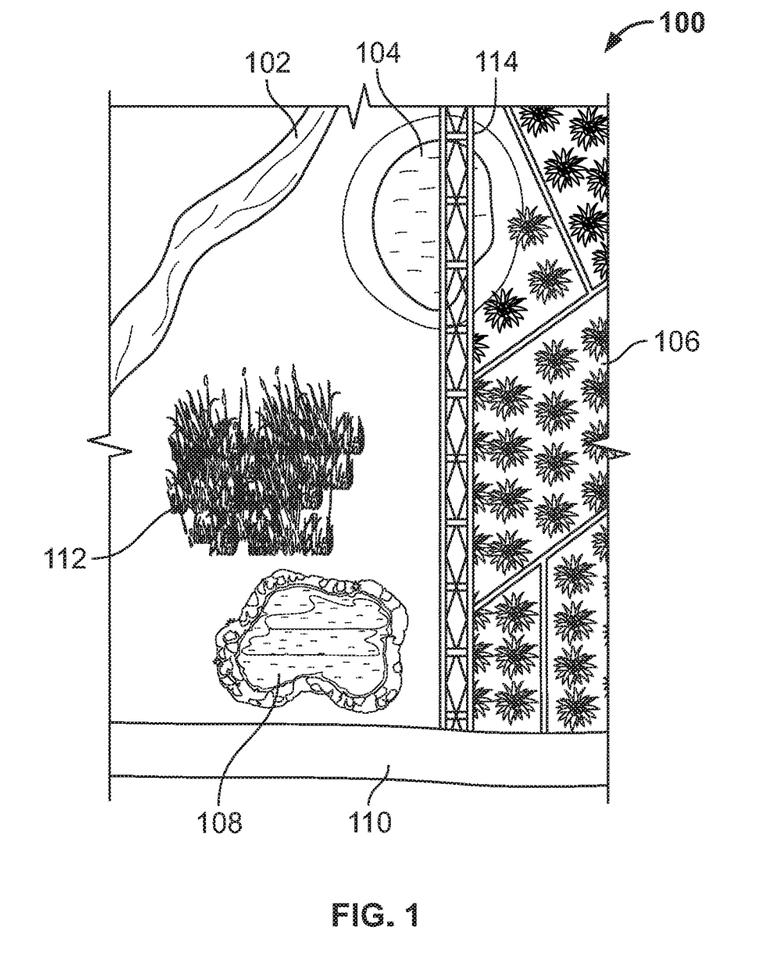
FIG. 1 depicts a geographic area according to an embodiment.

FIG. 1 depicts an image of geographic area 100 which has several features including stream 102, depression 104, planting field 106, fence 114, pond 108, path 110, and marsh 112. The image of geographic area 100 can be viewed by a user in order to identify zones where agricultural materials should be applied, zones where the application of agricultural material should be avoided, and zones that should not be traversed by an agricultural machine. For example, a user can designate that agricultural material should be applied to a zone located between stream 102 and depression 104 and that an agricultural machine should avoid traversing areas adjacent to each of stream 102, depression 104, and marsh 112.

The image of geographic area 100 can be a satellite image or aerial image. The image of geographic area 100 can also be a representation of an area generated by a user drawing geographic area 100 while viewing the actual geographic area or viewing a satellite image or an aerial image of the area. Information pertaining to geographic area 100 can also be obtained by sampling via local scouting or generated by agricultural application data input by a user.

In one embodiment, geographic area 100 is displayed to a user via a display of a zone mapping system. The zone mapping system displays an image of geographic area 100 and a user can identify various zones within geographic area 100 using, for example, a touchscreen display.

In one embodiment, various features of geographic area 100 are automatically recognized by the zone mapping system. For example stream 102, depression 104, planting field 106, pond 108, path 110, and marsh 112 can be detected in the image of geographic area 100 using one or more of a variety of object recognition techniques such as, for example, edge matching, greyscale matching, etc. Similarly, additional features can be automatically recognized as well.

In one embodiment, automatic recognition can be augmented or replaced by the features of geographic area 100 being identified and designated by a user. For example, a user can trace the features and then enter an identification of what the traced feature represents. In one embodiment, a file containing various polygons can be imported and a user can select a polygon to enclose an area. Geographic features can also be identified by an operator driving a machine around a field or an internal area and a polygon surrounding the area can be generated based on the movement of the machine. In one embodiment, a lines can be drawn on a coverage map to encompass all covered areas.

Figure 2:
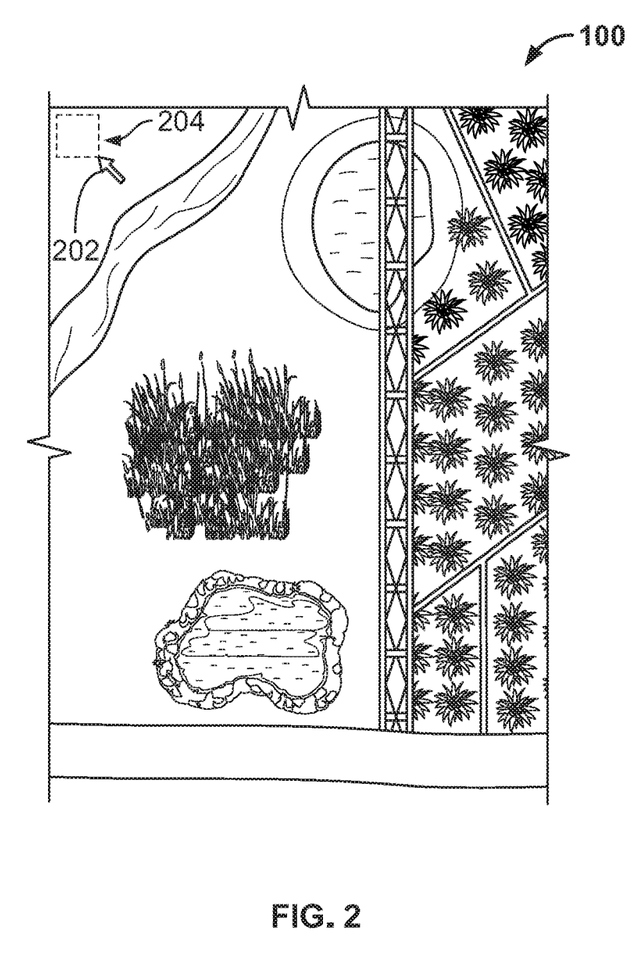
FIG. 2 depicts selection of a zone of the geographic area according to an embodiment.

The user may designate various zones of geographic area 100 by drawing polygons around desired areas using a touchscreen or mouse. FIG. 2 depicts a user having selected a point located near the top left corner of the image of geographic area 100 and dragging pointer 202 down and to the right in order to designate a zone bounded by polygon 204.

Figure 3:
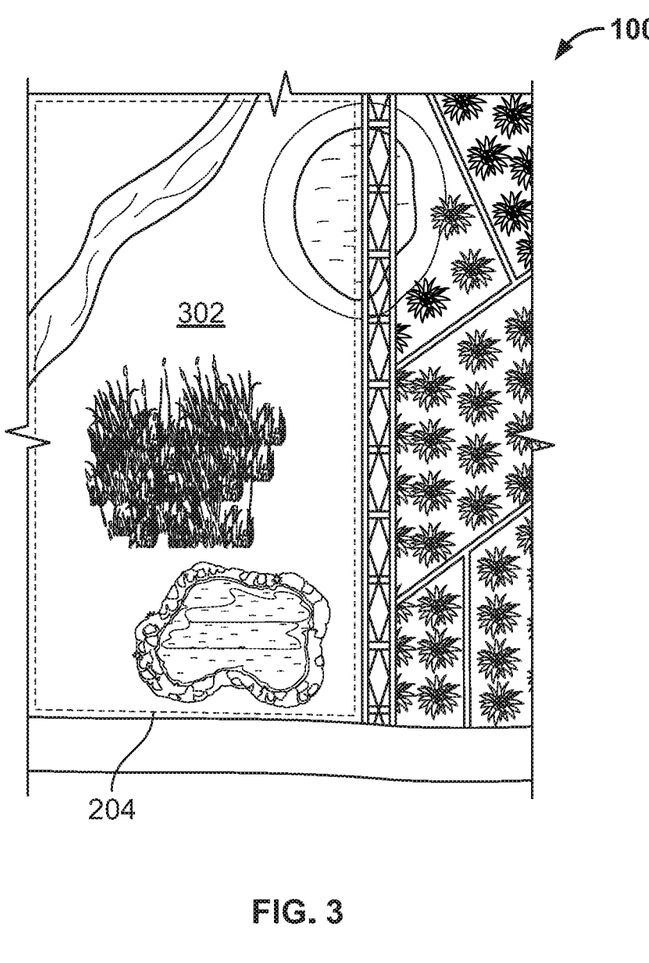
FIG. 3 depicts selection of a zone of the geographic area according to an embodiment.

FIG. 3 depicts zone 302 which was identified by the user drawing polygon 204 that defines the boundary of zone 302. A user can draw a four sided polygon to designate a boundary of an area. In one embodiment, a user can draw a polygon having more or less than four sides in order to designate a boundary of a zone or a boundary of a feature. For example, a complex shape may require a user to draw a polygon with many sides in order to designate a boundary that borders a zone, a stream, pond or other irregularly shaped feature of geographic area 100. In one embodiment, a user can draw a line to identify an area. For example, a user can draw a line that extends from one side of a screen displaying geographic area 100 to an adjacent side of the screen in order to identify a triangular shaped area bordered by two sides of the screen and the user drawn line.

After the user has identified a zone, such as zone 302, the user can select one or more treatments to be applied to the identified zone. For example, a user can select to plant seeds in order to grow a crop in the selected zone. The user can also select treatments such as pesticides, growth promoters, fertilizer, or other treatments to be applied to the selected zone.

Crops can have certain crop requirements regarding the use of treatments. For example, a certain amount and concentration of pesticide over a specified area may be required to be applied to a certain crop. As such, a pesticide for soybeans, for example, may be required to be applied at a rate of two ounces per square yard at a concentration of fifty percent in a particular area.

In addition to crop requirements, certain application restrictions may be defined by a government entity or a manufacturer of a treatment regarding application of the treatment. For example, a pesticide may be restricted from being applied within a certain distance from flowing water, such as a stream. An application restriction regarding the application of the pesticide can indicate that the pesticide should not be applied to an area within five feet of the flowing water. Application restrictions, in one embodiment, pertain to the restriction of agricultural materials to an area for any of a variety of reasons. Application restrictions can be defined by a government entity, manufacturer, and/or supplier of the agricultural materials.

In addition to crop requirements and application restrictions, it may also be desirable to have the zone mapping system identify areas that an agricultural machine should not attempt to traverse, such as a pond, stream, or depression. For example, a particular agricultural machine may not be designed to traverse water over a certain depth. As such, a pond having a depth greater than the depth that the agricultural machine was designed for should be avoided. In addition, a particular agricultural machine may not be designed to operate on slopes having an incline over a threshold value. As such, a slope having an incline over the threshold value should be avoided. In one embodiment, restrictions regarding operation of an agricultural machine are referred to as machine restrictions. Machine restrictions can be defined by a government entity, machine manufacturer, and/or a dealer of the agricultural machine.

After the user selects a treatment for the identified zone, the zone mapping system designates certain areas where the treatment should not be applied. In one embodiment, areas where the treatment should not be applied are based on crop requirements, application restrictions, and/or physical obstacles to be avoided (e.g., slopes of depressions, bodies of water, etc.)

Figure 4:
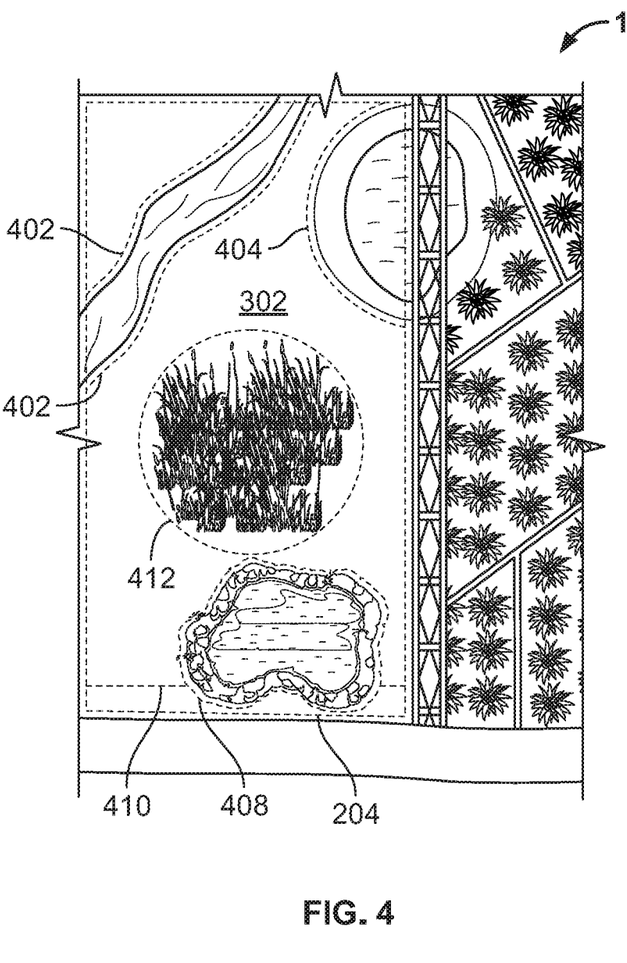
FIG. 4 depicts an identification of features within an identified zone of the geographic area according to an embodiment.

FIG. 4 depicts geographic area 100 having boundaries based on offset distances from features. In this embodiment, the offsets, and depicted boundaries, are based on application restrictions associated with an agricultural pesticide that a user wants to apply to zone 302. Restrictions can vary based on the material to be applied. For example, a material can be restricted to no application within 5 feet of a boundary, direct application to ground without use of a nozzle from 5 feet to within 25 feet of the boundary, and application using large droplets only from 25 feet to 40 feet of the boundary.

Stream boundary 402 is based on an offset from each side of stream 102 that is required by an entity, such as a government, to prevent the agricultural pesticide from contaminating the water of stream 102. For example, a governmental regulation may restrict the application of the agricultural pesticide from being applied closer than five feet from stream 102. As such, stream boundary 402 is located five feet from each side of stream 102.

Depression boundary 404 is based on an offset designated by an equipment manufacturer regarding operation of the agricultural machine that will be used to apply the agricultural pesticide. For example, the equipment manufacturer may indicate that the agricultural machine is not to be operated on slopes or on slopes having an incline greater than a threshold. For example, an equipment manufacturer may indicate that a particular agricultural machine should not be operated on slopes having a grade greater than, for example, seven percent. Depression boundary 404 identifies how far from depression 104 the agricultural machine should operate in order to prevent a potential accident, such as a rollover of the agricultural machine.

Pond boundary 408 is based on an offset from the edge of pond 108 that is required by an entity, such as a government, to prevent the agricultural pesticide from contaminating the water of pond 108. For example, a governmental regulation may restrict the application of the agricultural pesticide from being applied closer than five feet from pond 108. As such, pond boundary 408 is located five feet from each side of pond 108.

Path boundary 410 is based on an offset from the edge of path 110 that is required by the manufacturer of the agricultural pesticide to be applied in order to prevent humans or animals from being exposed to the agricultural pesticide by walking on path 110. For example, an offset of fifteen feet from an area where humans or animals travel may be specified by the manufacturer of the agricultural pesticide.

Marsh boundary 412, in one embodiment, is based on an offset designated by a government to prevent the agricultural pesticide from contaminating marsh 112. In one embodiment, marsh boundary 412 is based on an offset designated by an equipment manufacture regarding operation of the agricultural machine that will be used to apply the agricultural pesticide. The offset may be designated by the equipment manufacturer to prevent operation of the agricultural machine in water or operation over ground that may not be sufficiently stable to support the weight of the agricultural machine. In one embodiment, one offset applies to how close a machine can be to a natural feature, such as a marsh, and another offset applies to how close material can be applied to the natural feature. It should be noted that, in one embodiment, when two similar offsets apply to a feature, the larger offset is used. For example, when two offsets pertaining to how close a machine can be to a natural feature, or when two offsets pertaining to how close material can be applied to the natural feature, the larger of the two offsets that pertain to the same operation is used.

Figure 7:
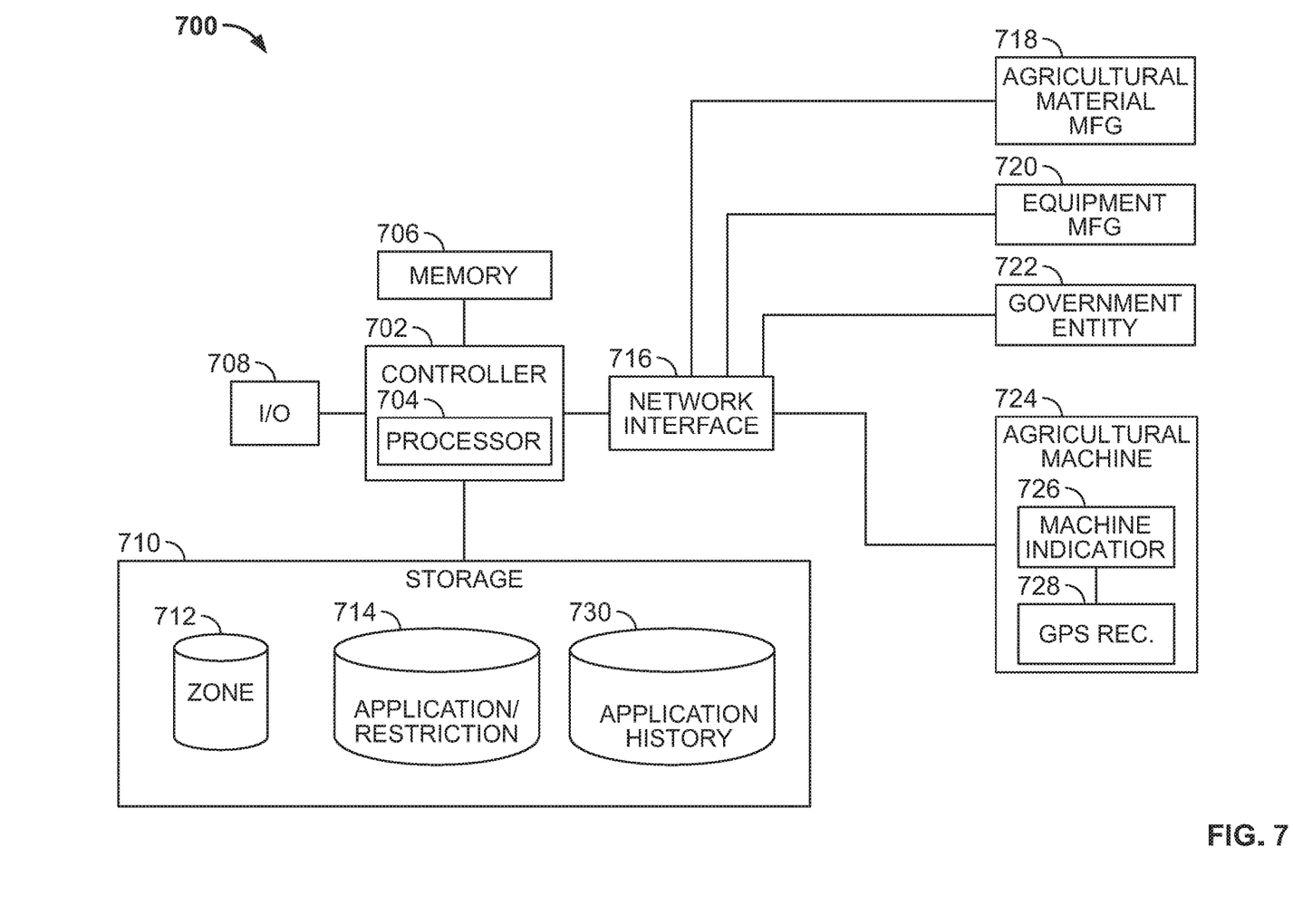
FIG. 7 depicts a zone mapping system and related components according to an embodiment.

In one embodiment, application information such as crop requirements and application restrictions are stored in a table in an application/restriction database. Zone and feature information are stored in a table in a zone database. The creation of zones can be performed when material to be applied is being loaded. Since each material to be applied can have different restrictions, the application zones can vary based on the material to be applied. In one embodiment, multiple restrictions apply to a particular material. For example, droplet size, application rate, tillage depths, application type and other restrictions may apply to a particular material. FIG. 7 (described in detail below) depicts a controller 702 in communication with storage 710 in which application/restriction database 714 and zone database 712 are stored.

In one embodiment, application details can be used to modify the application of materials. The application details can be input by a user and/or stored in the application/restriction database 714. In one embodiment, application details pertain to droplet size that is to be used when applying a particular liquid. Droplet size can be controlled for different applications. Droplet size affects the distribution of the liquid being sprayed. For example, smaller droplets can create a coating film while bigger droplets are not blown away by wind or evaporate before touching the crop to which the liquid is to be applied.

Application/restriction database 714 includes tables of records pertaining to application information. FIG. 5 depicts table 500 having multiple records 502, 504, 506, 508, 510. Each record pertains to a feature 520. Records 502, 504, 506, 508, and 510 pertain to standing water, flowing water, a slope, an adjacent crop, and human/animal traffic, respectively. Each record also contains restrictions and/or requirements related to each feature. For example, record 502 pertains to standing water and includes information concerning the application of pesticide A 522. As indicated in record 502, pesticide A 522 may not be applied closer than five feet to standing water. Similarly, restrictions are provided in record 502 for growth promoter A 524, and fertilizer A 526. In addition, operation of agricultural equipment with respect to certain features can be identified in equipment manufacturer 528. For example, record 506 indicates that for feature 520 pertaining to slope, the equipment manufacture recommends not operating the agricultural machine on a slope of greater than seven percent. FIG. 5 depicts sample records and application information. Additional records and application information can be included as well. For example, information identifying how each feature in a geographic location can be modified can be stored in one or more records. The information can pertain to how soil in an area can be modified, such as by use of a harrow up to a specific depth.

In one embodiment, application information and restrictions are treated as individual layers and the application requirements or restrictions of each layer are addressed individually and in their context with respect to other layers. For example, in one embodiment, a first layer pertains to an application rate. With respect to the first layer, high pressure is used to produce fine droplets that will create a good coating on a crop to which the liquid is applied. A second layer pertains to water that is protected and a restriction associated with that region identifies a limit of droplet size that can be applied. When the machine enters the region to which that restriction applies, the droplet size of the liquid as it is applied is changed by making the droplet size larger (e.g., coarser) than the size without the restriction. The larger droplet size reduces the potential of the droplets to wind drift into the water located in the region. In one embodiment, the larger droplet size is achieved by lowering the pressure applied to the application nozzles. The lower pressure reduces the flow through the nozzle. In response, other parameters may be adjusted in order to maintain the correct flow and/or application rate. For example, the reduced flow through a nozzle due to a decreased pressure may be compensated for by reducing a speed of the machine spraying the liquid, changing to a nozzle having a higher flow rate (e.g., a nozzle that produces a, using a pulse width modulation with a higher duty cycle, using an additional nozzle.

Additional layers may modify operation of the machine as well. For example, a third layer may cause a speed at which the machine travels to be reduced when entering an area that is sloped in order to prevent the machine from rolling over. This slower travel speed may require adjustment of other parameters, such as flow rate, in order to compensate for the change in speed and maintain a specified application rate.

In one embodiment, zone and feature location information are stored in a table in a zone database 712. FIG. 6 depicts a table 600 having multiple records 602, 604, 606, and 608. Each record pertains to a zone or feature 620. Records 602, 604, 606, and 608 pertain to zone A, feature A, feature B, feature C, and feature D, respectively. Each record also contains coordinates that define the shape and size of each feature. For example, record 602 pertains to zone A and coordinate A 622, coordinate B 624, coordinate C 626, coordinate D 628, and coordinate E 630 define the boundary of zone A. The coordinates are identified, in one embodiment, by their latitude and longitude. In other embodiments, the coordinates can be identified using other types of geographic coordinates and/or coordinate systems may be used. In one embodiment, additional information, such as elevation, may also be identified.

In one embodiment, the coordinates identify multiple points of a polygon. For example, record 602 which pertains to a polygon identified as zone A and is associated with coordinates A-E. Coordinate A 622 identifies a first point of the zone A polygon. Coordinate B 624 identifies a second point of the zone A polygon and Coordinate A 622 and coordinate B 624 together identify a side of the zone A polygon. Similarly, coordinate C 626 identifies a third point of the zone A polygon and coordinate B 624 and coordinate C 626 together define another side of the zone A polygon. Coordinate D 628 identifies a fourth point of the zone A polygon and together with coordinate C 626 define another side of the zone A polygon. Coordinate E 630 identifies a point of the zone A polygon and together with coordinate D 628 defines a side of the zone A polygon. It should be noted that coordinate E 630 has the same coordinates as coordinate A 620. In one embodiment, this indicates that there are no additional coordinates and the identified coordinates together form a closed polygon. In another embodiment, a string of stored coordinates defining a polygon ends with an end message that signals the last coordinate identified is the final coordinate defining the polygon. In yet another embodiment, a polygon is identified by two stored coordinates that span an area and any coordinates between the two stored coordinates are considered relative vectors inside this spanned area. Zone A 602 and feature A 604, feature B 606, feature C 608, and feature D 610 can represent zones and features in a geographic area such as zone 302, stream 102, depression 104, planting field 106, pond 108, path 110, and marsh 112 as shown in FIG. 1.

FIG. 7 depicts zone mapping system 700 according to one embodiment. Controller 702 can be an electric control device such as a programmable logic controller, application specific integrated circuit (ASIC), field programmable gate array (FPGA), etc. In one embodiment, controller 702 is implemented using a computer. Controller 702 contains a processor 704 which controls the overall operation of the controller 702 by executing computer program instructions which define such operation. The computer program instructions may be stored in a storage device 710, or other computer readable medium (e.g., flash drives, solid state drives, magnetic disk, CD ROM, etc.), and loaded into memory 706 when execution of the computer program instructions is desired. Thus, the method steps of FIG. 8 (described below) can be defined by the computer program instructions stored in the memory 706 and/or storage 710 and controlled by processor 702 of controller 704 executing the computer program instructions. For example, the computer program instructions can be implemented as computer executable code programmed by one skilled in the art to perform an algorithm defined by the method steps of FIG. 8. Accordingly, by executing the computer program instructions, processor 704 of controller 702 executes an algorithm defined by the method steps of FIG. 8. One skilled in the art will recognize that an implementation of a controller could contain other components as well, and that controller 702 is a high level representation of some of the components of such a controller for illustrative purposes. It should be noted that one or more of the computing devices described above may be located remotely and accessed via a network (e.g. one or more of the computing devices may be cloud based.)

Memory 706 is electrically connected to controller 702 and can comprise one or more types of random access memory, both volatile and non-volatile. Storage 710 can contain databases pertaining to zone mapping. In one embodiment, storage 710 contains zone database 712 which stores information pertaining to zones of a geographic area (such as zone 302 of geographic area 100 shown in FIG. 3). Storage 710 can also contain application/restriction database 714 which stores information pertaining to agricultural material and agricultural machines and the recommendations for application and restrictions for application of agricultural materials and use of agricultural machines. Storage 710 can also contain application database 730 which stores information pertaining to the application of agricultural materials to zones identified in zone database 712.

Input/output 708 can comprise various inputs, such as a keyboards, touch screens, etc. Input/output 708 can comprise various outputs, such as displays, lights, alarms, etc. The inputs and outputs of input/output 708 are electrically connected to controller 702. Network interface 716 is electrically connected to controller 702 and facilitates communication with controller 702 via various devices. Network interface 716 can be various connection types including wired and wireless. Network interface 716 can also utilize a variety of communication protocols. Network interface 716 allows controller 702 to communicate with a variety of devices.

In one embodiment, network interface 716 allows controller 702 to communicate with a variety of different devices that can each be associated with a different entity. In one embodiment, controller 702 is in communication with an agricultural material manufacturer device 718 via network interface 716 in order to receive application and restriction information related to agricultural materials. Controller 702 is also in communication with an equipment manufacturer device 720 via network interface 716 in order to receive operation information regarding equipment. Controller 702 is also in communication with a government entity device 718 via network interface 716 in order to receive information pertaining to restrictions related to the application of agricultural materials.

In one embodiment, controller 702 is in communication with agricultural machine 724 via network interface 716. Agricultural machine 724 is equipped with a machine indicator 726 which, in one embodiment, is a computer that can be used to track and/or control operation of agricultural machine 724. In one embodiment, machine indicator 724 includes additional components, such as components that indicate an orientation of agricultural machine 724 and the position of working elements (e.g., implements) of agricultural machine 724. Agricultural machine 724 can include a global navigation satellite system (GNSS) receiver, also referred to as a global positioning system (GPS) receiver 728. GPS receiver 728 is electrically connected to machine indicator 726. GPS receiver 728 determines the location of its associated antenna and transmits the location information to machine indicator 726. Operation information and location information pertaining to agricultural machine 724 can be transmitted to controller 702 via network interface 716. In addition, zone maps and application/restriction information for a particular geographic area can be transmitted from controller 702 via network interface 716 to machine indicator 724.

Figure 8:
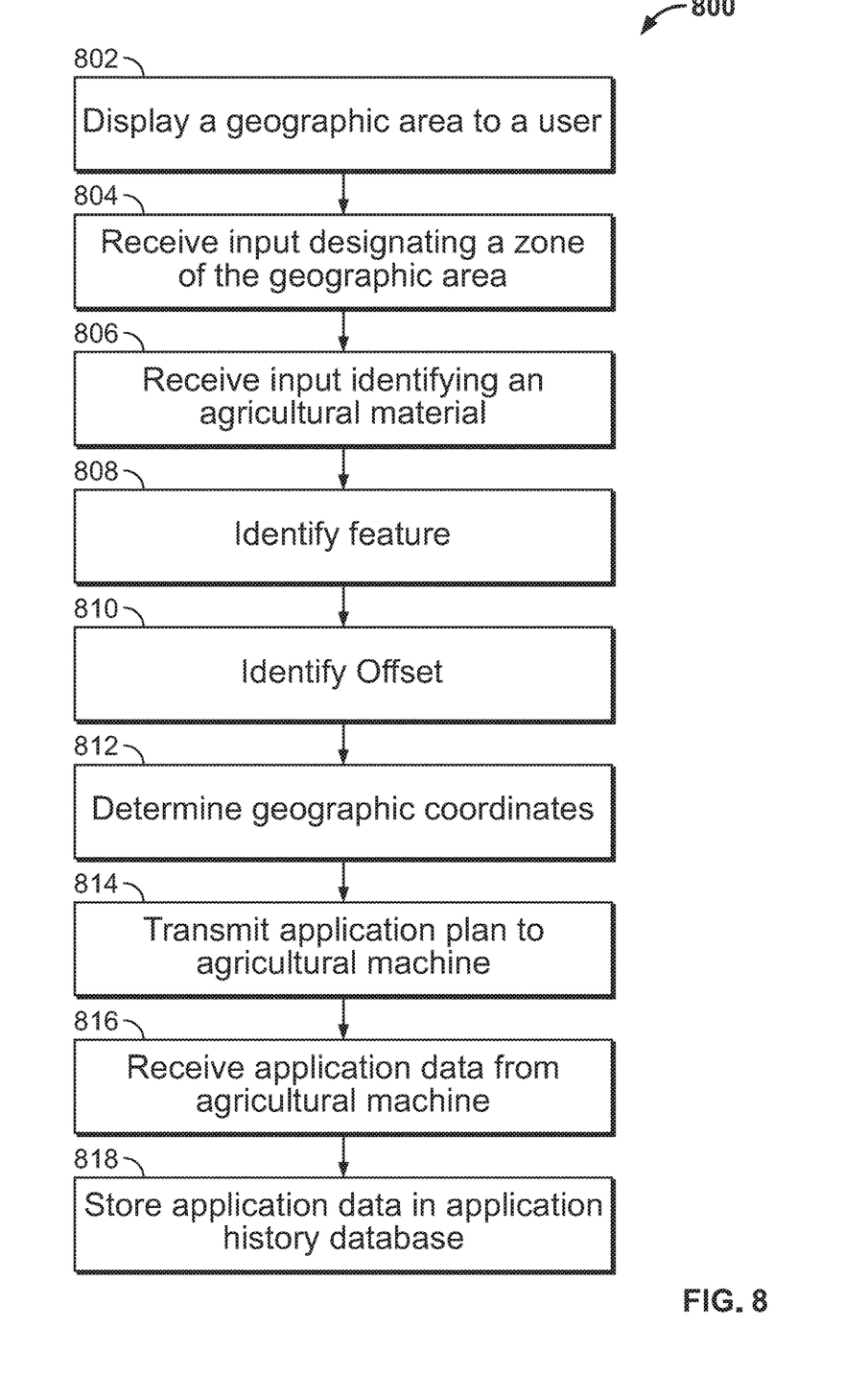
FIG. 8 depicts a method for zone mapping and application information tracking according to an embodiment.

FIG. 8 depicts a flow chart of method 800 for mapping zones and generating application plans according to one embodiment. At step 802, a geographic area is displayed to a user. In one embodiment, the geographic area for display is generated by controller 702 and displayed to a user as shown and described in connection with FIG. 1. At step 804, input is received from a user identifying a zone of the geographic area. In one embodiment, the user selects the zone by selecting a corner of a desired zone and dragging a pointer to an opposite corner of the zone as shown and described in connection with FIGS. 2 and 3. It should be noted that other shapes can be identified by a user by modifying the sides of the zone shown in FIG. 3. In addition, a user can identify a zone by tracing a boundary around the area desired to be in the zone.

At step 806, input is received from the user identifying an agricultural material for application to the identified zone. In one embodiment, the user can select from a plurality of agricultural materials shown in a pop-up or drop down menu. The agricultural materials identified in the menu can be selected from agricultural materials identified in application/restriction database 714. Alternatively, a label located on packaging containing the agricultural materials can be scanned using a hand-held device, such as a scanner. In one embodiment, a user can enter identification information pertaining to an agricultural material and information concerning that agricultural material can be obtained from agricultural material manufacturer device 718 and/or government entity (e.g., federal, local, regional, etc.) device 722 shown in FIG. 7. Information concerning the agricultural material, such as application rate, droplet size, etc., can be obtained from the manufacturer and/or distributor of the agricultural material.

Figure 5:
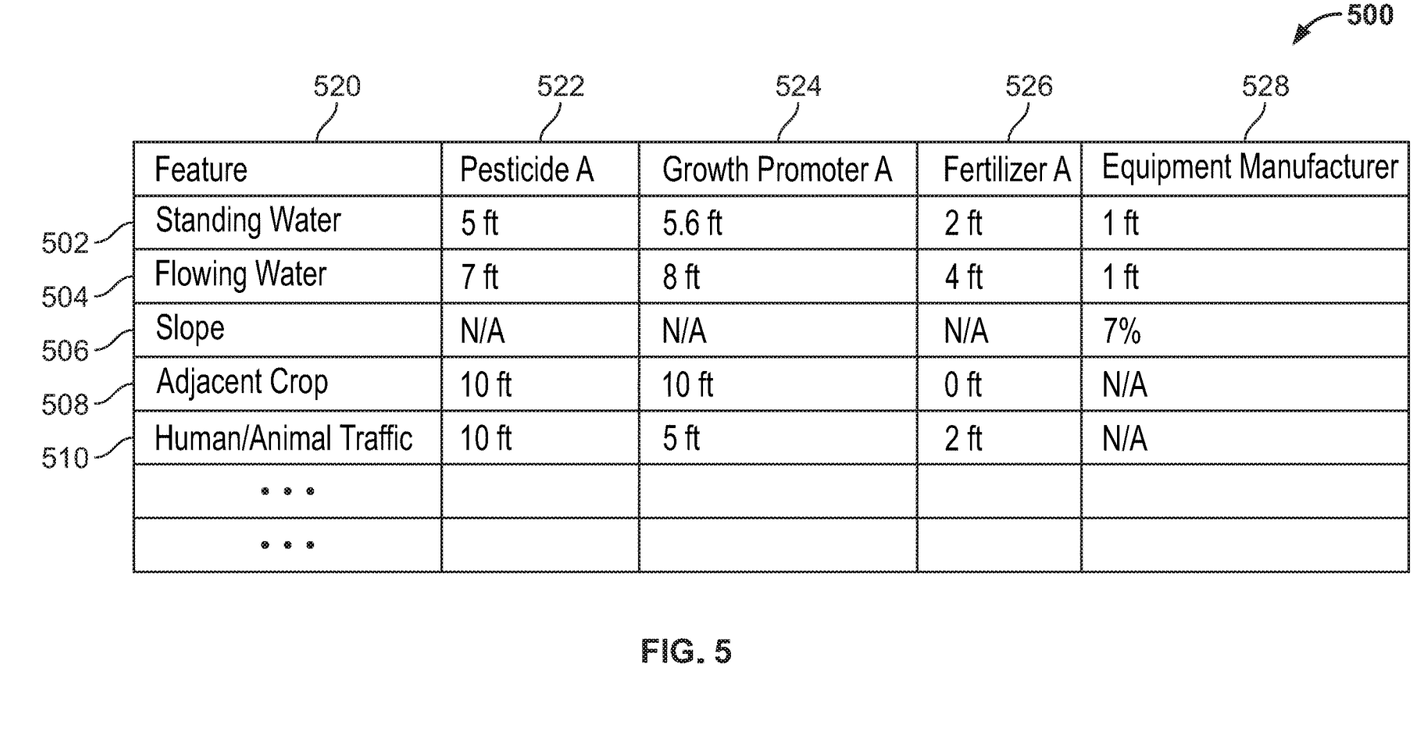
FIG. 5 depicts a table of application information according to an embodiment.
Figure 6:
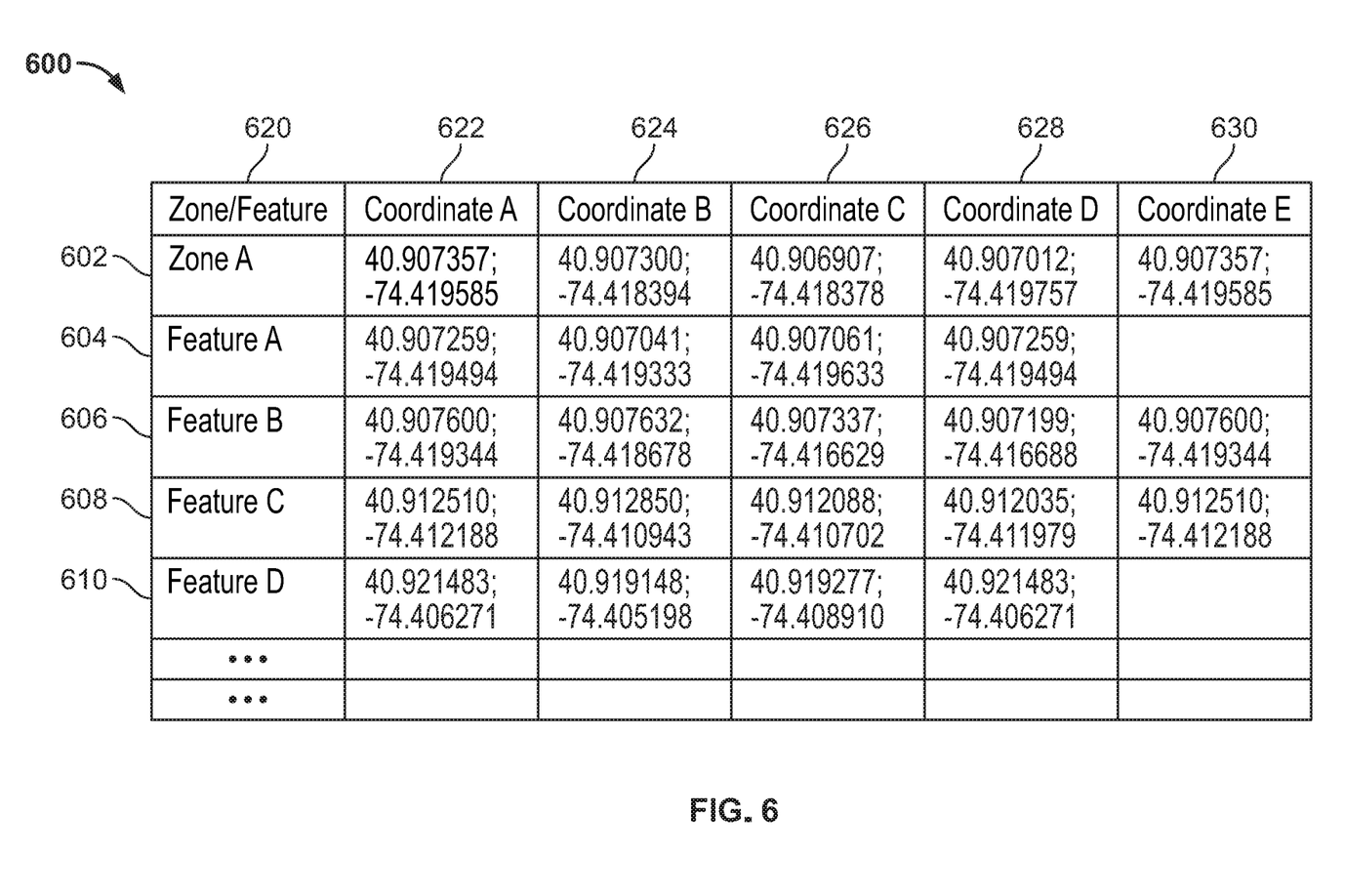
FIG. 6 depicts a table of zones and features according to an embodiment.

Next, an application plan is determined for the identified zone. In one embodiment, determining an application plan comprises identifying a feature, identifying an offset, and determining geographic coordinates of an area adjacent to the feature based on the offset. At step 808, a feature in the zone is identified as described above in connection with FIGS. 3 and 4. For example, stream 102 shown in FIG. 1 can be identified. At step 810, an offset for the feature is then determined based on the type of the feature and the agricultural material selected as described in connection with FIGS. 4 and 5. At step 812, geographic coordinates bounding an area adjacent to the feature are then determined based on the identified offset. It should be noted that, due to agricultural material, features, and the particular zone, the application rates, droplet size, spray parameters, etc. of an agricultural material can vary in different areas of the particular zone. In one embodiment, restrictions in each zone can modify a typical application rate in a general location when the application occurs in a particular location within the general location. Adjacent zones may have similar application rates but restrictions can modify application rates in one of the adjacent zones. In one embodiment, limitations of the application machine may affect application rates. For example, if a particular zone requires a different application rate than an adjacent zone, and the application machine cannot apply different application rates in the adjacent zones, the more restrictive application rate may be used for both adjacent zones.

At step 814, the application plan is transmitted to an agricultural machine. In one embodiment, controller 702 transmits the application plan to machine indicator 726 of agricultural machine 724 via network interface 716. The transmission can be via a wired or wireless connection. The agricultural machine, such as an agricultural sprayer then applies the agricultural material to a geographic area identified by the selected zone. As the agricultural machine operates to apply the agricultural material in accordance with the application plan, the machine indicator of the agricultural machine records information pertaining to application of the agricultural material such as location and related application rate. This information gathered by the machine indicator is referred to as application data. In one embodiment, the application data is generated based on operation of the agricultural machine in accordance with the application plan. However, the application data can deviate from the application plan for various reasons such as obstacles located in a zone, operator error, etc.

At step 816, application data is received from the agricultural machine. At step 818, the application data received from the agricultural machine is stored in application history database 730. The information stored in application history database 730 can be provided to various entities in order to show how agricultural material was applied to the zone. For example, a government entity may request information from a user pertaining to the application of a particular agricultural material. The user can find information pertaining to all applications of the particular agricultural material that have occurred and provide this information to the government entity. In one embodiment, recorded data can also be used for determining desired application rates in further application areas/steps.

In one embodiment, a method for mapping zones and generating application plans begins with identifying a geographic position and movement of an application machine. The application machine is identified and its status and orientation are determined. A map showing the machine and the area surrounding the machine is shown on a display. Local data, such as an existing boundary, zone, or obstacles, is also displayed on the map. New features within the area displayed on the map are identified and coordinates for the new features are determined. Information pertaining to application of material to an area of the map is loaded and the material to be applied to the area is identified (e.g., by user selection of a product or scanning of a package of product using a hand-held device). Information pertaining to the material is then obtained from one or more sources such as the product manufacturer, machine and/or implement manufacturer, a material advisor, or a government entity. Based on the information that is obtained, an offset width and, in one embodiment, a restriction type are determined and the information is applied to the area displayed by the map. Application information (rates and restrictions) are determined for zones of the map and the material is applied in accordance with the determined application information.

In one embodiment, the application information is determined on a machine separate from the agricultural machine. In those embodiments, the application information is transmitted to the agricultural machine. In one embodiment, the agricultural machine records data pertaining to how the material is applied to an area based on the application information. It should be noted that the actual applied material may differ from the intended or desired application determined as described above due to various issues that prevent desired application. In one embodiment the data recorded by the agricultural machine pertaining to the material applied to the area identified by the map is stored in a location (e.g., an application history database).

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

What is claimed is:

1. A method comprising:
   displaying a geographic area to a user;
   receiving input designating a zone of the geographic area;
   receiving input identifying an agricultural material to be applied to the zone;
   determining an application plan for the zone comprising a plurality of geographic coordinates, an offset from a feature in the zone, and related application rates of the agricultural material, wherein the determining an application plan for the zone comprises:
   identifying the feature in the zone;
   identifying the offset from the feature based on a type of the feature and the agricultural material;
   determining geographic coordinates bounding an area adjacent to the feature based on the offset; and
   determining application restrictions for the area adjacent to the feature; and
   transmitting the application plan to an agricultural machine to configure the agricultural machine to operate based on the application plan.

2. The method of claim 1, further comprising:
   operating the agricultural machine based on the application plan.

3. The method of claim 2, further comprising:
   receiving application data from the agricultural machine; and
   storing the application data in an application history database.

4. The method of claim 3, wherein the application data is generated based on the operating.

5. The method of claim 1, wherein the application plan comprises application rates for the agricultural material based on the agricultural material, the zone, and the feature.

6. The method of claim 5, wherein the application rates vary in different areas of the zone based on the agricultural material, the zone, and the feature.

7. An apparatus comprising:
   a processor; and a memory to store computer program instructions, the computer program instructions when executed on the processor cause the processor to perform operations comprising:
displaying a geographic area to a user;
receiving input designating a zone of the geographic area;
receiving input identifying an agricultural material to be applied to the zone;
determining an application plan for the zone comprising a plurality of geographic coordinates, an offset from a feature in the zone, and related application rates of the agricultural material, wherein the determining an application plan for the zone comprises:
identifying the feature in the zone;
identifying the offset from the feature based on a type of the feature and the agricultural material;
determining geographic coordinates bounding an area adjacent to the feature based on the offset; and
determining application restrictions for the area adjacent to the feature; and
transmitting the application plan to an agricultural machine to configure the agricultural machine to operate based on the application plan.

8. The apparatus of claim 7, the operations further comprising:
operating the agricultural machine based on the application plan.

9. The apparatus of claim 8, the operations further comprising:
receiving application data from the agricultural machine; and
storing the application data in an application history database.

10. The apparatus of claim 9, wherein the application data is generated based on the operating.

11. The apparatus of claim 7, wherein the application plan comprises application rates for the agricultural material based on the agricultural material, the zone, and the feature.

12. The apparatus of claim 11, wherein the application rates vary in different areas of the zone based on the agricultural material, the zone, and the feature.

13. A computer readable medium storing computer program instructions, which, when executed on a processor, cause the processor to perform operations comprising:
displaying a geographic area to a user;
receiving input designating a zone of the geographic area;
receiving input identifying an agricultural material to be applied to the zone;
determining an application plan for the zone comprising a plurality of geographic coordinates, an offset from a feature in the zone, and related application rates of the agricultural material, wherein the determining an application plan for the zone comprises:
identifying the feature in the zone;
identifying the offset from the feature based on a type of the feature and the agricultural material;
determining geographic coordinates bounding an area adjacent to the feature based on the offset; and
determining application restrictions for the area adjacent to the feature; and
transmitting the application plan to an agricultural machine to configure the agricultural machine to operate based on the application plan.

14. The computer readable medium of claim 13, the operations further comprising:
operating the agricultural machine based on the application plan.

* * * * *